(12) United States Patent
Pienaar

(10) Patent No.: US 11,623,710 B2
(45) Date of Patent: Apr. 11, 2023

(54) HANDLEBAR APPARATUS WITH AN INTEGRAL ELECTRONIC DEVICE FOR A BICYCLE

(71) Applicant: Rudi Pienaar, Alpharetta, GA (US)

(72) Inventor: Rudi Pienaar, Alpharetta, GA (US)

( * ) Notice: Subject to any disclaimer, the term of this patent is extended or adjusted under 35 U.S.C. 154(b) by 0 days.

(21) Appl. No.: 17/577,008

(22) Filed: Jan. 16, 2022

(65) Prior Publication Data

US 2023/0064633 A1 Mar. 2, 2023

Related U.S. Application Data

(60) Provisional application No. 63/240,150, filed on Sep. 2, 2021.

(51) Int. Cl.

| | |
|---|---|
| *G06F 3/14* | (2006.01) |
| *B62J 50/22* | (2020.01) |
| *B62J 50/21* | (2020.01) |
| *G06F 3/16* | (2006.01) |
| *G06F 1/16* | (2006.01) |
| *H04M 1/72409* | (2021.01) |

(52) U.S. Cl.
CPC ............. *B62J 50/22* (2020.02); *B62J 50/225* (2020.02); *G06F 1/1656* (2013.01); *G06F 3/14* (2013.01); *G06F 3/167* (2013.01); *H04M 1/724098* (2022.02)

(58) Field of Classification Search
CPC .......... G06F 3/14; G06F 3/167; G06F 1/1656; B62J 50/225; B62J 50/22; H04M 1/724098
See application file for complete search history.

(56) References Cited

U.S. PATENT DOCUMENTS

| | | | |
|---|---|---|---|
| 2016/0059920 A1* | 3/2016 | Takanashi .............. | B62K 19/40 74/551.8 |
| 2018/0001950 A1* | 1/2018 | Allen ......................... | B62J 9/21 |
| 2019/0347913 A1* | 11/2019 | Heemstra ........... | G08B 13/1427 |
| 2021/0197913 A1* | 7/2021 | Montez .................. | B62K 23/02 |

* cited by examiner

*Primary Examiner* — Towfiq Elahi
(74) *Attorney, Agent, or Firm* — Barry Choobin; Patent 360

(57) ABSTRACT

A handlebar apparatus for a bicycle that includes an elongated housing having a proximal end and a distal end configured as handle portions that can be grabbed by hands of a cyclist for steering the bicycle. The apparatus further includes a transparent panel encased by the housing, an electronic device also housed in the housing, and a display coupled to the electronic device and juxtaposed to the transparent panel such that the display is visible from outside through the panel. The electronic device can connect an external computing device through a network.

10 Claims, 4 Drawing Sheets

HANDLEBAR APPARATUS WITH AN INTEGRAL ELECTRONIC DEVICE FOR A BICYCLE

CROSS-REFERENCE TO RELATED APPLICATIONS

This application claims priority from the U.S. provisional patent application Ser. No. 63/240,150, filed on Sep. 2, 2021, which is incorporated herein by reference in its entirety.

FIELD OF INVENTION

The present invention relates to a handlebar apparatus for a bicycle, and more particularly, the present invention relates to a bicycle handlebar integrated with an electronic device and a display.

BACKGROUND

Cycling, also known as biking, has been a popular leisure activity, fitness aid, and a means of transportation. The popularity of cycling is increasing among children, youths, and adults due to growing concerns for health and the environment. Cycling as a means of transportation is environmentally friendly and most countries are encouraging their people to use cycles for short distances. Also, cyclists like to explore new places on their bicycles alone or in groups.

The cyclists often need their smartphones while cycling for several reasons, such as for maps, making a call, or reading a message. The cyclists have to stop their bikes frequently to check their smartphones which is both undesirable and risky. Clamps are known to mount a smartphone to a handlebar of the bicycle. However, the use of clamps has several limitations. First, the clamps do not protect the smartphone from weather or accidental damage. Second, cyclists often need to remove their phones from the clamp to use and remount the phone after use, which can become tedious and laborious. Additionally, the functionality provided by the apps, such as Apple CarPlay™, that allows connecting a smartphone to a car's entertainment system for navigation, call, entertainment, and many other features is not available for bicycles.

Therefore, a desire is there for a device that is devoid of the aforesaid drawbacks of the clamps and has the functionality of connecting to a smartphone, IoT device, and sensors for a range of functionalities.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a handlebar apparatus for bicycles that includes the functionality of a computing device.

It is another object of the present invention that a smartphone, IoT device, or sensor can connect with the handlebar apparatus.

It is still another object of the present invention that the handlebar apparatus can be dust-resistant and water-resistant.

It is yet another object of the present invention that the handlebar apparatus can be shock-resistant.

It is still another object of the present invention that the smartphone can be controlled by the handlebar apparatus and vice-versa, through APPLE CARPLAY™ or ANDROID AUTO™.

In one aspect, disclosed is a handlebar apparatus for bicycles. The handlebar apparatus can include an elongated housing having a proximal end and a distal end, and a top and a bottom. Each the proximal end and the distal hand of the housing can be configured as tubular handles that can be grabbed by hands of the cyclist for steering the bicycle. The housing can further include a fastener for mounting the handlebar apparatus to a head tube of a frame of the bicycle. The top of the housing can have a transparent panel. The handlebar apparatus can further comprise an electronic device encased in the housing and a display operably coupled to the electronic device. The display can be juxtaposed to the transparent panel such that a user can view the content presented on the display through the transparent panel.

In one aspect, the electronic device can include a processor, a memory, and a networking circuitry. The networking circuitry can connect to an external network, such as Wi-Fi and Bluetooth for connecting to the internet or pairing with an external computing device, such as a smartphone, IOT Device or sensor.

In one aspect, the housing including the encased transparent panel can be made water-resistant and shock resistant.

In one aspect, disclosed is a handlebar apparatus for a bicycle, the handlebar apparatus includes an elongated housing having a proximal end and a distal end, the proximal end and the distal end are configured as handle portions configured to be grabbed by hands of a cyclist for steering the bicycle; a panel, the panel is transparent and encased by the housing along a periphery of the panel; an electronic device encased in the housing and configured to connect to external computing devices, sensors and IOT devices through a network; and a display coupled to the electronic device and juxtaposed to the panel such that the display is visible from outside through the panel.

In one implementation of the handlebar apparatus, the housing and the panel can prevent ingress of water and dust. The housing and the transparent panel can be shock resistant. The housing can further include a clamp for mounting the handlebar apparatus to a frame of the bicycle. The electronic device can further include a processor, a memory, and a network circuitry, wherein the network circuitry is configured to connect an external network. The external network is a Bluetooth or Wi-Fi. The housing and the handle portions are straight but slightly curved. Alternatively, the handle portions are curved about 90 degrees with reference to a horizontal plane.

In one implementation of the handlebar apparatus, the external computing device can be a smartphone, IoT device, or a sensor, wherein the processor and the memory are configured to implement a method comprising the steps of pairing the electronic device with the smartphone, IoT device, or sensor; receive a set of instructions from the smartphone, IoT device, or sensor; and upon receiving the set of instructions, implement a plurality of features of the smartphone, IoT device, or sensor on the electronic device and the display. The plurality of features can be voice-guided navigation and notifications for an incoming call, incoming messages, and incoming sensor readings.

In one implementation of the handlebar apparatus, the handlebar apparatus further comprises a rechargeable power source encased within the housing.

In one implementation of the handlebar apparatus, the external computing device can be a smart watch worn by the cyclist, wherein the processor and the memory are configured to implement a method comprising the steps of: pairing the electronic device with the smartwatch; receive a set of instructions from the smartwatch; and upon receiving the set of instructions, implement a plurality of features of the smartwatch on the electronic device and the display.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
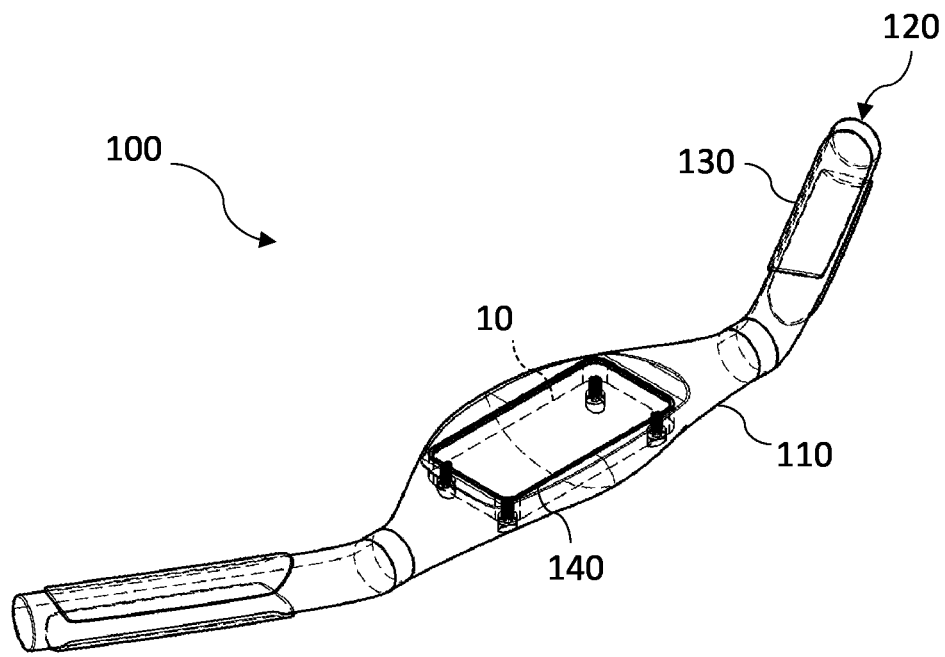
FIG. 1 is a top and side perspective view of the handlebar apparatus, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a handlebar apparatus for a bicycle that can provide a safer way to use a smartphone while cycling without mounting the smartphone to the handlebar of the bicycle. The handlebar apparatus can, through a wired or wireless connection, connect to a smartphone or a similar device of the cyclist to provide various functionalities such as CARPLAY™, ANDROID AUTO™, navigation, attending calls, reading messages, listening to songs, watching videos, and the like. Notifications can be displayed by the handlebar apparatus without the need of stopping the bicycle to check the phone. The cyclists can control different features of the smartphone directly through the handlebar apparatus. The handlebar apparatus can also connect to a smartphone, IoT device, or a sensor, which can be controlled from the handlebar apparatus. The handlebar apparatus can connect to a smartphone or similar device and provide voice-guided navigation to the cyclist. The cyclist no longer has to mount their smartphone on the handlebar of the bicycle.

Figure 2:
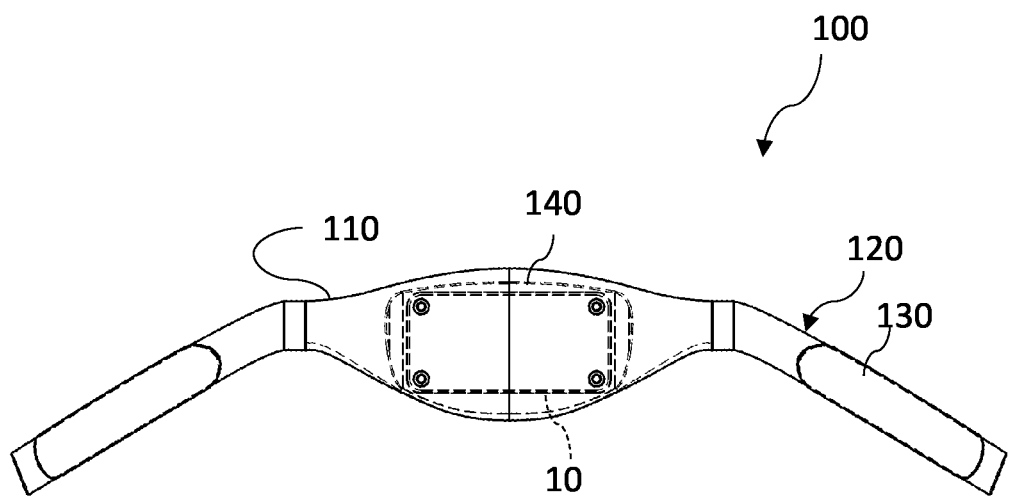
FIG. 2 is a top view of the handlebar apparatus shown in FIG. 1, according to an exemplary embodiment of the present invention.
Figure 3:
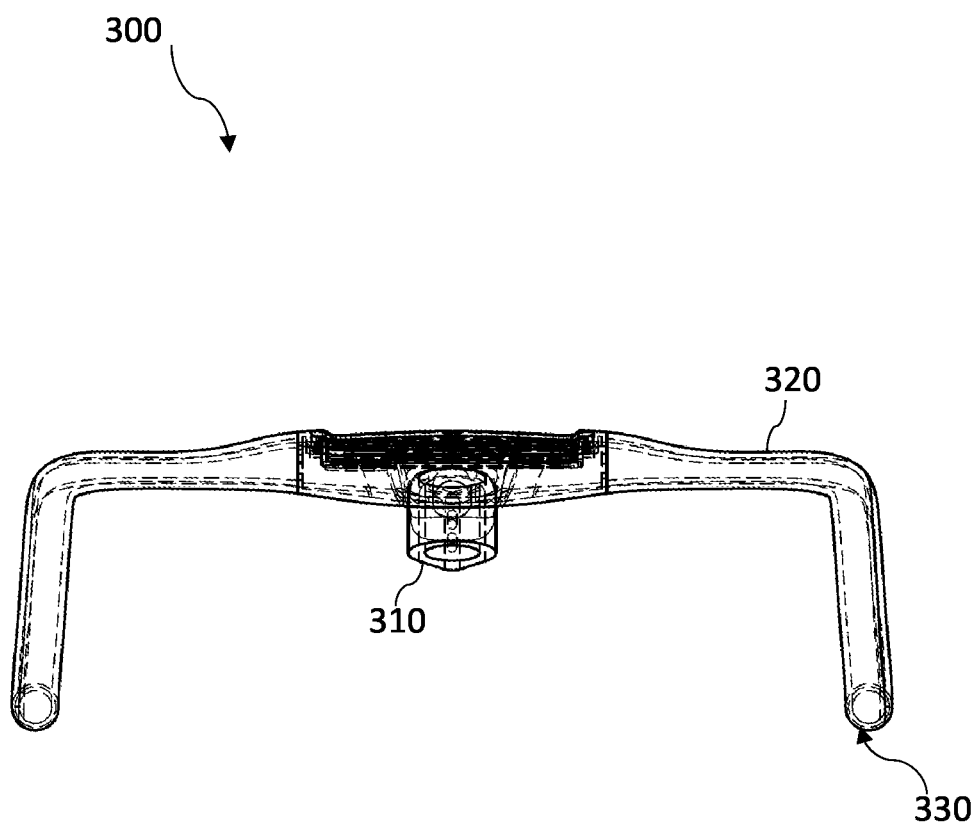
FIG. 3 is a side view of another exemplary embodiment of the handlebar apparatus showing a clamp for mounting the handlebar apparatus to a frame of a bicycle, according to the present invention.
Figure 4:
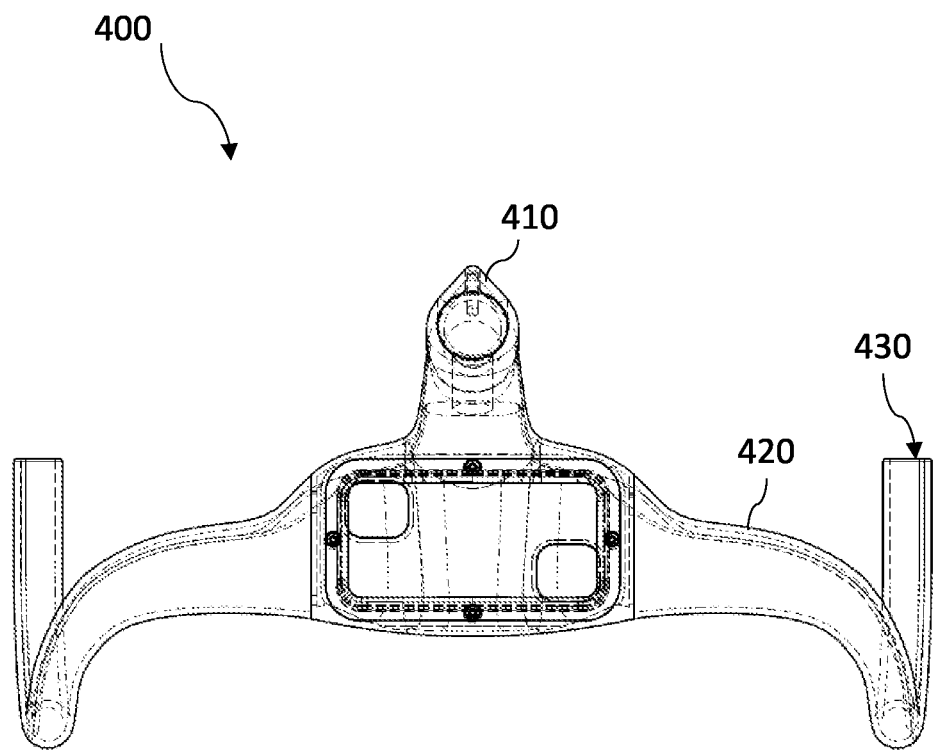
FIG. 4 is a top view of another exemplary embodiment of the handlebar apparatus, according to the present invention.

Referring to FIGS. 1 and 2 which illustrates an exemplary embodiment of the disclosed handlebar apparatus 100. The handlebar apparatus 100 can include an elongated housing 110 that resembles a standard bicycle handlebar. Housing 110 can include a proximal end and a distal end along a length of housing 110. Each the proximal end and the distal end of the housing 110 can be configured as tubular handle portions 120 that can be grabbed in the hands of the cyclist for steering the bicycle. The handle portions 120 can be configured in different shapes as shown in FIGS. 1, 2, and 3. The handle portions can be similar to standard bicycle handles that are grabbed in hands for steering the bicycle. Suitable grips 130 can also be provided on the handle portions 120 for enhanced hand grip and comfort. It is understood that the handle portions 120 can be integral with the housing 110 or can be removably coupled to the housing through a suitable fastening mechanism and both the implementations are within the scope of the present invention. Also, the housing 110 including the handle portions 120 can be manufactured in a range of ergonomic designs suitable for different body positions of the cyclist and intended use of the bicycle. It is envisioned that the disclosed handlebar apparatus can be implemented for different bicycles, such as mountain bikes, road bikes, and fixed gear bikes. Depending upon the type of bicycle, the ergonomics of the housing 110 can be designed to provide overall steering, stability, and reliability. For example, the housing can be flat with slight curves as shown in FIG. 1 or the handle portion of the housing can be curved upwards or downwards as shown in FIGS. 3 and 4.

The housing 110 can also include a suitable clamp for mounting the handlebar apparatus 100 to a frame of a bicycle. FIG. 3 which is a side view of the exemplary embodiment of the handlebar apparatus 300 shows a clamp 310 as the fastening mechanism that can mount the apparatus 300 to a head tube of a frame of a bicycle. Such clamps for mounting standard handlebars to the head tube of the bicycles are known in the art and any such clamp can be incorporated without departing from the scope of the present invention. The clamp 310 can be seen mounted to the housing 320 of the handlebar apparatus 300 and also shown in FIG. 3 handle portions 330. FIG. 4 shows the handlebar apparatus 400 having a clamp 410 as the fastening mechanism in a front of the housing 420. Also, it can be seen in FIG. 4 that are the handle portions 430 curved outwards and towards the clamp.

Again, referring to FIG. 1, the handlebar apparatus 100 can further include a panel 140 that can be transparent. Panel 140 can be sealably encased at its periphery by the housing, preferably on the top of the housing. The transparent panel 140 and the housing 110 can be water-resistant, dust-resistant, and shock-resistant, such that to prevent ingress of water and dust into the housing 110. The disclosed housing 110 can protect the internal components of the housing 110 from external environmental conditions, such as harsh sunlight and rains. The disclosed handlebar apparatus can be used in any weather condition, such as in rain. Moreover, the housing 110 can be made from any rigid and durable material that can safeguard the internal components from external shocks, such as the falling of the bicycle. The transparent panel 140 can be further made shatterproof and can have one or more coatings, such as anti-reflective coating and smudge resistance coating. Such coatings are known in the art and any such coatings on the transparent panel that can enhance the visibility through the transparent panel are within the scope of the present invention.

Figure 5:
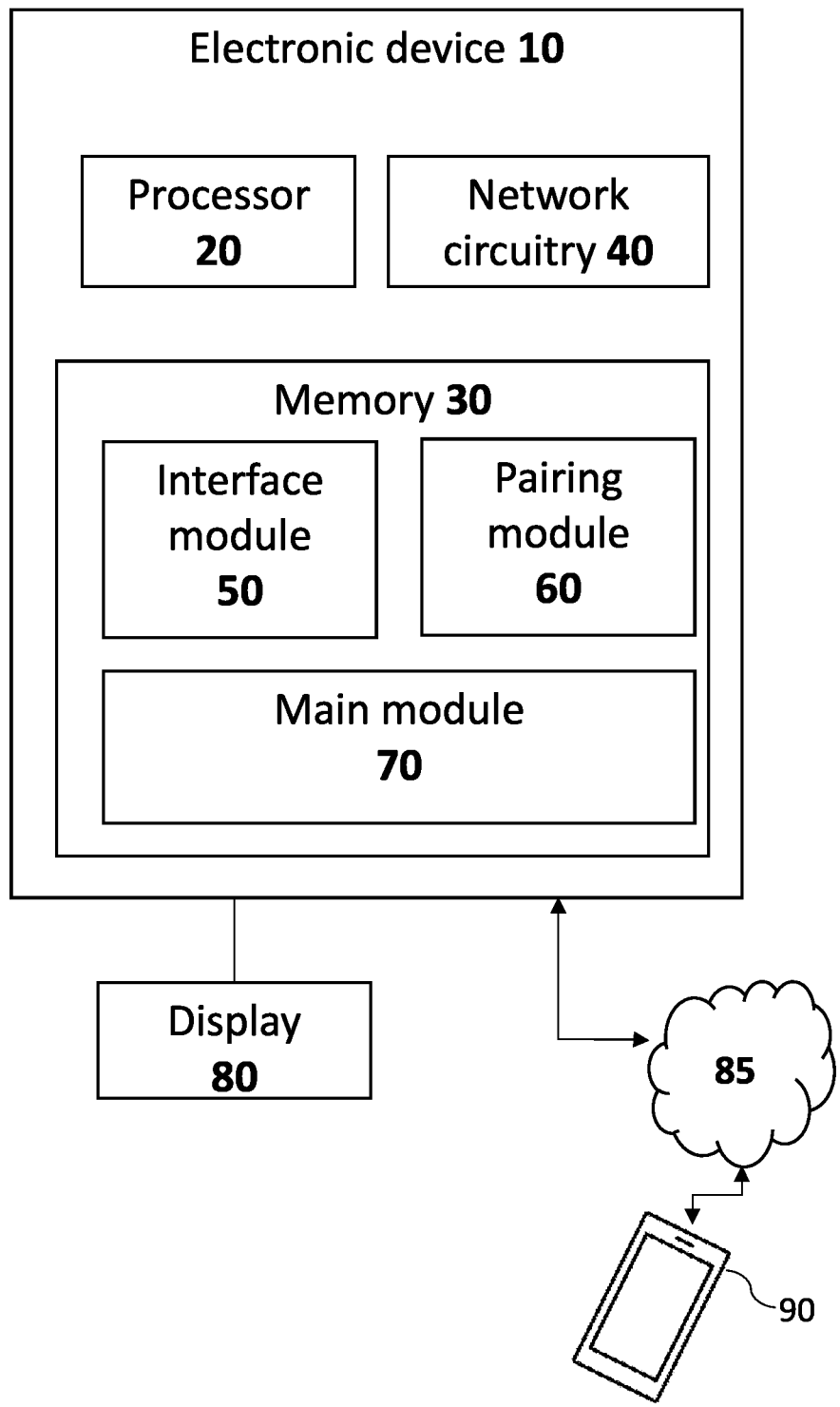
FIG. 5 is a block diagram showing an exemplary embodiment of the electronic device of the handlebar apparatus, according to an exemplary embodiment of the present invention.

The disclosed handlebar apparatus 100 can further include an electronic device 10 encased within the housing 110 and protected from the external environment. The electronic device 10 can further be coupled to a display 80 juxtaposed to the transparent panel 140 and configured to present the content generated by the electronic device 10 through the transparent panel 140. The display 80 can be juxtaposed to the transparent panel 140 such that the display 80 can be visible from outside through the transparent panel 140. The display can be an LCD display or similar display known to a skilled person for use in an electronic device, such as a smartphone or a tablet computer. The electronic device 10 can include a processor 20, a memory 30, and a network circuitry 40 connected through a system bus. The processor 20 can be any logic circuitry that responds to, and processes instructions fetched from the memory 30. The memory 30 may include one or more memory chips capable of storing data and allowing any storage location to be directly accessed by the processor 20. The network circuitry 40 can connect to an external network 85 that can be a wired or wireless network. Suitable examples of the wireless network can include Bluetooth® and Wi-Fi. The electronic device 10 can connect to an external computing device 90 through the external network 85. Memory 30 can include modules according to the present invention for execution by the processor 20. The memory can include an interface module 50 which upon execution by the processor 20 can provide an interface implemented on the display 80 for interacting and presenting the content to the cyclist. The pairing module 60 upon execution by the processor 20 can provide for pairing the electronic device 10 to an external computing device 90, such as the smartphone shown in FIG. 5. The main module 70 upon execution by the processor 20 can provide for different functionalities such as navigation, attending calls, presenting notifications, and like. The main module 70 can support commercially available application software having functionality similar to the CarPlay™ app available from Apple Inc and Android Auto™ from Google LLC. The CarPlay™ app can work with an iOS-enabled smartphone and can provide a smarter and safer way to use the iPhone while driving a car. The driver of the car can get directions, make calls, send, and receive messages, and enjoy music on the car's built-in display. Although such apps are generally available for cars and the like, similar features can also be implemented by the disclosed handlebar apparatus. The cyclist may not have to look at their smartphone while cycling and the majority of the functionalities of the smartphone can be implemented on the disclosed handlebar apparatus.

The main module 70 can receive instructions from the smartphone 90 to implement one or more features, such as providing voice-guided navigation. The smartphone can also be provided with an application software configured to interact with the electronic device 10 and send different instructions to the electronic device. Features of the smartphone such as attending calls, viewing messages and alerts, climate information, and the like can be implemented on the main module 70. The application software can be made available through a distribution service provider, for example, Google Play™ operated and developed by Google, and the app store by Apple. In addition to the application software, a website-based interface can also be provided through the world-wide-web. The application software can also be provided for the desktop environment, such as Windows™, Linux, and macOS.

The disclosed handlebar apparatus 100 can further be connected to an IoT device or sensors deployed in the bicycle to measure data and telemetry from such IoT device or sensors. The main module 70 can process information received from the external device, IoT Device or sensors to show information to the cyclist. Moreover, the disclosed electronic device 10 can further be coupled to a smartwatch worn by the cyclist and present the information received from the smartwatch on the display. The pairing module 60 can further allow the electronic device 10 to connect to any IoT device, or sensors, on an e-bike/e-bicycle or e-scooter and control that IoT Device or Sensor through the interface module of the electronic device. Moreover, the pairing module can connect to any drivetrain, or motor, which can be controlled or run through the interface module provided by the electronic device. The disclosed electronic device can process any custom programs and applications to control the IoT devices and sensors used to operate e-mobility bicycles and scooters.

The interface module 50 can include can receive various data through wired and wireless input ports, such as pedometer data, speedometer data, and odometer data. Such data can be processed to display different travel-related information, such as the speed and distance traveled on the display 80. The cyclist or user of the disclosed handlebar apparatus 100 can select the information that can be presented on the display 80. For example, an interface can be implemented on the smartphone of the user by the application software, wherein the interface allows the user to select features that can be visible on the display. Templates can also be provided that allow arranging different features, such as a clock, speed, call icon, and like on the display 80. The user can select the desired template from different templates provided on the smartphone of the user.

The electronic device 10 can be powered by a rechargeable battery also encased in the housing. Charging circuitry can also be provided for charging the rechargeable battery from an external power supply. In one implementation, the charging circuitry can provide for both wired and wireless charging functionality. Suitable charging ports can also be disposed in the housing that allows connecting an external charging cable further connected to the power supply. Such charging ports can have plugs to prevent ingress of dust and liquid. Suitable examples of rechargeable batteries can include Lithium-ion batteries. Also, a suitable heat dissipation mechanism can also be incorporated into the housing for removing heat generated by the battery and circuit board.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A handlebar apparatus for a bicycle, the handlebar apparatus comprises:
    an elongated housing having a proximal end and a distal end, the proximal end and the distal end are configured as handle portions that can be grabbed by hands of a cyclist for steering the bicycle;
    an electronic device built into the elongated housing and configured to connect to an external computing device through a network, the electronic device comprises a processor, a memory, and a network circuitry, wherein the network circuitry is configured to connect an external network, the electronic device is operably coupled to a drivetrain or motor of the bicycle, wherein the electronic device provides an interface for controlling the drivetrain or motor,
    wherein the electronic device is configured to implement a method comprising the steps of:
    pairing the electronic device with a smartphone;
    receive a set of instructions from the smartphone;
    upon receiving the set of instructions, implement a plurality of features of the smartphone on the electronic device and the display, wherein the plurality of features comprises voice-guided navigation, calls, reading messages, listening to songs, and watching videos;
    connect to an IoT device deployed in the bicycle;
    receive, from the IoT device, telemetry data;
    present processed information from the telemetry data; and
    control the smartphone,
    wherein the electronic device is configured to process any custom program and application to control one or more IoT devices and sensors used to operate e-mobility bicycles and scooters,
    wherein the electronic device is configured to provide wireless Apple Car play and Android Auto connectivity and functionality.

2. The handlebar apparatus according to claim 1, wherein the elongated housing is configured to prevent ingress of water and dust.

3. The handlebar apparatus according to claim 2, wherein the elongated housing is shock resistant.

4. The handlebar apparatus according to claim 1, wherein the elongated housing further comprises a clamp for mounting the handlebar apparatus to a frame of the bicycle.

5. The handlebar apparatus according to claim 1, wherein the external network is Bluetooth.

6. The handlebar apparatus according to claim 1, wherein the external network is Wi-Fi.

7. The handlebar apparatus according to claim 1, wherein the elongated housing and the handle portions are straight but slightly curved.

8. The handlebar apparatus according to claim 1, wherein the handle portions are curved about 90 degrees with reference to a horizontal plane.

9. The handlebar apparatus according to claim 1, wherein the handlebar apparatus further comprises a rechargeable power source encased within the elongated housing.

10. The handlebar apparatus according to claim 1, wherein the external computing device is a smartwatch worn by the cyclist, wherein the processor and the memory are configured to implement a method comprising the steps of:
    pairing the electronic device with the smartwatch;
    receive a set of instructions from the smartwatch; and
    upon receiving the set of instructions, implement a plurality of features of the smartwatch on the electronic device and the display.

* * * * *